United States Patent [19]
Morita et al.

[11] Patent Number: 5,179,464
[45] Date of Patent: Jan. 12, 1993

[54] POLYGONAL MIRROR WITH A REFLECTION FILM AND METHOD FOR MANUFACTURING THE SAME

[75] Inventors: Mizuo Morita; Hiroshi Kaneko, both of Kanagawa, Japan

[73] Assignee: Kabushiki Kaisha Toshiba, Kawasaki, Japan

[21] Appl. No.: 735,303

[22] Filed: Jul. 24, 1991

[30] Foreign Application Priority Data

Jul. 31, 1990 [JP] Japan .................................. 2-201477

[51] Int. Cl.⁵ .............................................. G02B 26/10
[52] U.S. Cl. ...................................... 359/217; 359/216; 359/900; 359/219
[58] Field of Search ................ 359/216, 217, 219, 900

[56] References Cited

U.S. PATENT DOCUMENTS

| | | | |
|---|---|---|---|
| 4,518,218 | 5/1985 | Diepeveen | 359/217 |
| 4,890,905 | 1/1990 | Van Rosmalen et al. | 359/900 |
| 5,064,262 | 11/1991 | Matsumoto et al. | 359/216 |

FOREIGN PATENT DOCUMENTS 60-15602  1/1985  Japan ................................. 359/217

Primary Examiner—Jack I. Berman
Attorney, Agent, or Firm—Foley & Lardner

[57] ABSTRACT

A polygonal mirror includes a base body having a circumferential surface composed of a plurality of plane surfaces or a columnar surface, a surface element, formed on the circumferential surface of the base body with a synthetic resin, whose circumferential surface is formed in a non-spherical shape, a reflection film formed on the surface of the surface element.

10 Claims, 3 Drawing Sheets

POLYGONAL MIRROR WITH A REFLECTION FILM AND METHOD FOR MANUFACTURING THE SAME

BACKGROUND OF THE INVENTION

1. Field of the Invention

The present invention relates, in general, to reflectors used for scanning the surface of an image carrier with a laser beam in a laser beam printer, for example. In particular, the invention relates to a polygonal mirror acting as a reflector in the laser beam printer and a method for manufacturing the polygonal mirror.

2. Description of the Related Art

A conventional polygonal mirror employed by a laser beam printer may be a flat surface polygonal mirror. In the flat surface polygonal mirror, aluminum having a large specific strength or other metal materials such as an oxygen-free copper, for example, are cut by a diamond bit so that the surface of the mirror is flat. However, in recent years, to simplify the optical system of an apparatus, e.g., laser beam printer, which uses the polygonal mirror, it has been desirable to form the surface of the polygonal mirror so that it has fθ-lens optical characteristics. Such a mirror is described as a non-spherical polygonal mirror whose surface has a non-spherical shape, e.g., a columnar surface or a cylindroid surface. The non-spherical polygonal mirror is made similar to the above-described flat surface polygonal mirror.

However, in the above-described conventional polygonal mirror, aluminum or other metal materials, e.g., an oxygen-free copper, are processed by a diamond bit to form the surface thereof in a plano-mirror finish. To obtain the plano-mirror finished surface, a super fine processing machine is required as a machine tool and furthermore a high accuracy processing condition is required resulting in an increased production cost. In particular, in the non-spherical polygonal mirror, the surface thereof is formed in a non-spherical shape, e.g., a columnar surface, a cylindroid surface. However, it is rather difficult to process the surface of the mirror in a plano-mirror finish with a high accuracy by a machine cut. The processing cost is further increased, as compared with that of the above-described flat surface polygonal mirror.

SUMMARY OF THE INVENTION

Accordingly, it is an object of the present invention to provide an improved polygonal mirror having a high plano-mirror finish with a low production cost.

It is another object of the present invention to provide a method for manufacturing a polygonal mirror having a high plano-mirror finish with a low production cost.

According to one aspect of the present invention, a polygonal mirror includes a base body having a circumferential surface, a surface element, attached on the circumferential surface of the base body, which has a non-spherical surface, and a reflection element attached on the non-spherical surface of the surface element.

A protection film may be formed on the reflection element to protect the reflection film from scratching.

According to another aspect of the present invention, there is provided a method for manufacturing a polygonal mirror including the steps of:

preparing a base body having a circumferential surface;

forming a surface element on the circumferential surface of the base body with a resin so that the circumferential surface of the surface element has a non-spherical shape; and forming a reflection film on the surface element.

According to still another aspect of the invention, there is provided a method for manufacturing a polygonal mirror comprising the steps of:

forming a base body having a circumferential surface and a central hole from a material which transmits ultraviolet rays;

placing the base body in a mold housing whose inner surface has a non-spherical shape;

forming a surface element on the circumferential surface of the base body with an ultraviolet hardening resin so that the circumferential surface of the surface element has a non-spherical shape;

radiating ultraviolet rays toward the surface element through the central hole and the base body to cure the ultraviolet hardening resin formed on the base body in the mold housing; and forming a reflection film on the surface element.

BRIEF DESCRIPTION OF THE ACCOMPANYING DRAWINGS

These and other objects and advantages of this invention will become more apparent and more readily appreciated from the following detailed description of the presently preferred embodiment of the invention, read in conjunction with the accompanying drawings wherein.

DETAILED DESCRIPTION OF THE PREFERRED EMBODIMENTS

Figure 1:
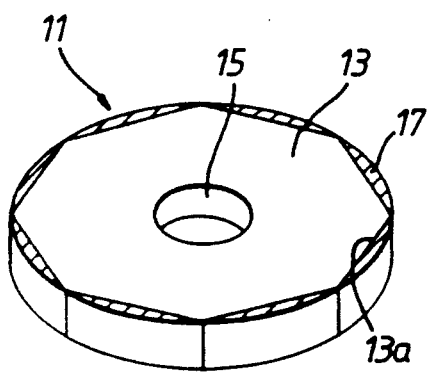
FIG. 1 is a perspective view of a polygonal mirror of one embodiment of the present invention.

Preferred embodiments of the present invention will now be described in more detail with reference to the accompanying drawings. As shown in FIG. 1, a polygonal mirror 11 includes a flat base body 13 and a through hole 15 formed in the center of base 13. The circumferential surface 13a of base body 13 is composed of a plurality of flat surfaces, i.e., a polygonal surface. Base body 13 is made of a steel, a non-ferrous metal or a non-metalic material, e.g., glass, etc. The material of base body 13 is not specifically limited. Each surface of base body 13 is formed with an average surface roughness and the shape thereof is also formed with an average accuracy. Furthermore, the circumferential surface 13a of base body 13 may be formed in a columnar shape.

A non-spherical surface element 17, the circumferential surface of which is composed of a plurality of plane surfaces, a columnar surface or a cylindroid surface, is fixed on the circumferential surface 13a of base body 13. The material of non-spherical surface element 17 is selected from a synthetic resin and a glass, for example. Non-spherical surface element 17 is integrally formed with base body 13 by injection molding or is fixed to base body 13 by glueing.

Figure 2:
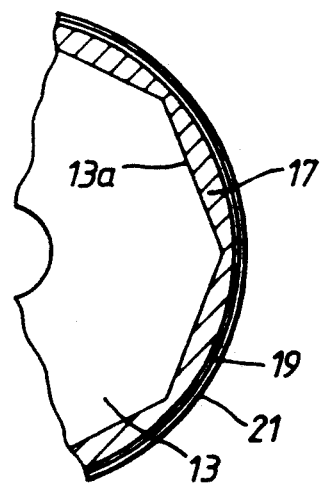
FIG. 2 is an enlarged partially cutaway view of the polygonal mirror shown in FIG. 1.

As shown in FIG. 2, a reflection film 19, e.g., aluminum or gold, is formed on the circumferential surface of non-spherical surface element 17 so that the surface of non-spherical surface element 17 is a plano-mirror finish. A protection film 21, e.g., $SiO_2$, $SiO$ or $TiO_2$, is also formed on reflection film 19 to protect the surface of reflection film 19 from scratching. Reflection film 19 and protection film 21 are formed by a well known method, e.g., vacuum deposition, sputtering or ion plating.

According to the above-described embodiment, since a plano-mirror surface is obtained by reflection film 19 formed on the circumferential surface of non-spherical surface element 17 of polygonal mirror 11, a plano-mirror finishing of the circumferential surface of base body 13 of polygonal mirror 11 by a super fine processing machine is not required. Thus, a fine blanking processing may be employed to process base body 13 of polygonal mirror 11, resulting in a decrease in the processing cost.

Dimensional changes in a polygonal mirror may occur under changes in the circumferential condition, e.g., temperature, humidity, etc., if the entire construction including base body 13 and non-spherical surface element 17 is made of a synthetic resin. However, in this embodiment, base body 13 of polygonal mirror 11 is made of a steel, a non-ferrous metal or a non-metalic material and only non-spherical surface element 17 is made of a synthetic resin. The ratio of synthetic resin contained in the entire construction of polygonal mirror 11 is exceedingly low, and thus, the dimensional changes in polygonal mirror 11 are maintained at an extremely low value which is insignificant in terms of accuracy.

A method for manufacturing the above-described polygonal mirror will now be described. Base body 13 of polygonal mirror 11 is formed by a fine blanking, a cold forging or a machinary cut executed on a steel or a non-ferrous metal prior to the formation of non-spherical surface element 17. At this stage, the circumferential surface of base body 13 is formed with an average surface roughness and the shape thereof is also formed with an average accuracy.

Figure 3:
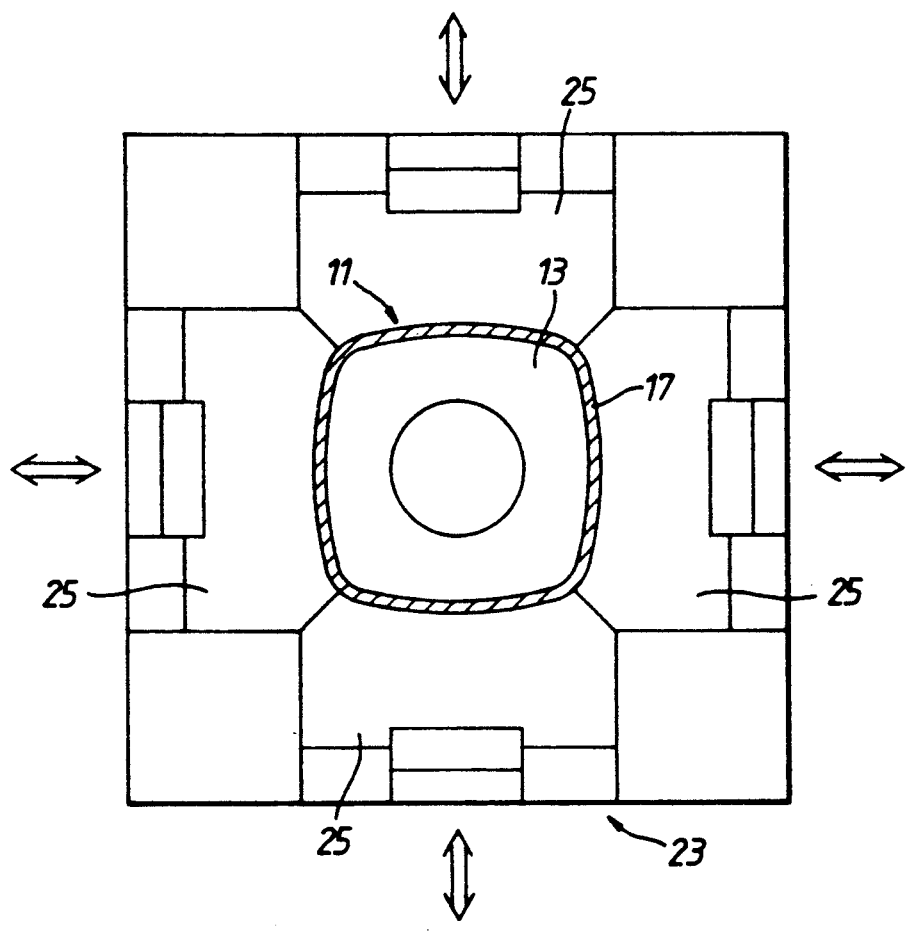
FIG. 3 is a plan view illustrating a metal mold wherein the base body of the polygonal mirror is located.
Figure 4:
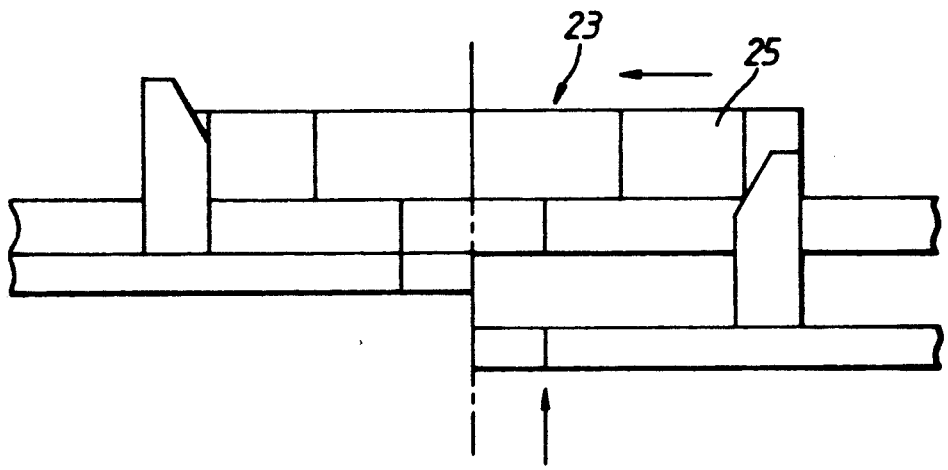
FIG. 4 is a semi diagrammatical vertical sectional view illustrating the metal mold shown in FIG. 3.

As shown in FIGS. 3 and 4, base body 13 having an average surface roughness and an average accuracy is located in a metal mold housing 23 which includes movable metal molding elements 25 each having a configuration inversed to the surface figure of non-spherical surface element 17. Then, non-spherical surface element 17 is integrally formed on the circumferential surface of base body 13 by an injection molding using a thermoplastic resin.

Figure 5:
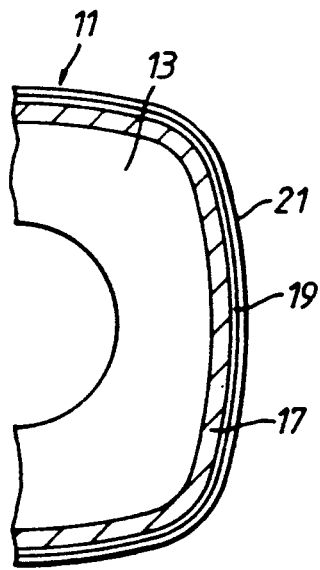
FIG. 5 is an enlarged partially cutaway view of a polygonal mirror manufactured by the metal mold shown in FIGS. 3 and 4.

After taking out base body 13 on which non-spherical surface element 17 has been formed, reflection film 19 and protection film 21 are formed in order on the circumferential surface of non-spherical surface element 17, as shown in FIG. 5. Thus, a polygonal mirror 11 having reflection film 19 is obtained.

In the conventional manufacturing method, since the circumferential surface of the conventional polygonal mirror is directly finished in a plano-mirror surface by a super precision machinary process, the material of the conventional polygonal mirror is limited, e.g., aluminum having a large specific strength. However, in the above described manufacturing method of the present invention, a steel, a non-ferrous metal or a non-metalic material can be used to make base body 13 of polygonal mirror 11. Furthermore, base body 13 of this embodiment is formed at an average surface roughness and an average accuracy.

Another embodiment of the method for manufacturing the polygonal mirror will now be described.

Figure 6:
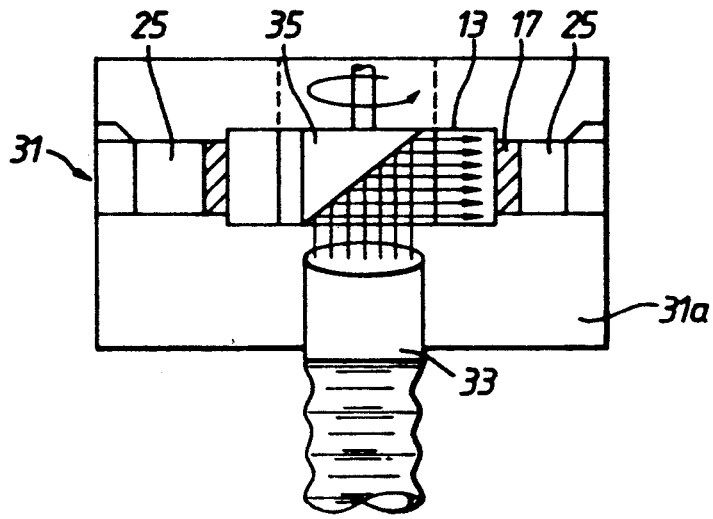
FIG. 6 is a schematic view illustrating a metal mold, using a lamp for radiating ultraviolet ray, wherein the base body of the polygonal mirror is disposed.

In this embodiment, an ultraviolet hardening resin is used to form non-spherical surface element 17. A metal mold housing 31 used in this embodiment is similar to that in the above-described first manufacturing method. However, as shown in FIG. 6, a lamp 33 is arranged in a base element 31a of metal mold housing 31 to radiate ultraviolet rays into central opening 15 of polygonal mirror 11. A rotatable reflection mirror 35 is located in central opening 15 of polygonal mirror 11 to reflect ultraviolet rays radiated from lamp 33 in a right angle toward the circumferential surface of base body 13 at which an ultraviolet hardening resin is fixed. Thus, ultraviolet rays fed from lamp 33 are led to the whole circumferential surface of base body 13 as reflection mirror 35 is rotated.

Figure 7:
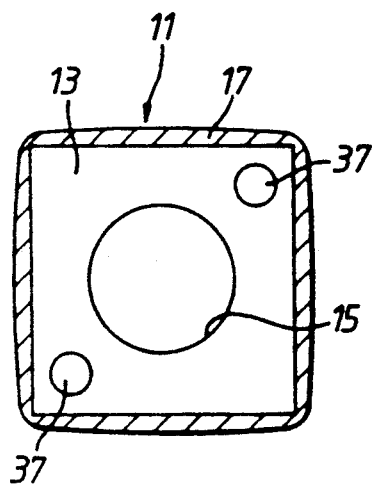
FIG. 7 is a plan view of the polygonal mirror manufactured by the metal mold shown in FIG. 6.

Firstly, base body 13 having central opening 15 is formed from a glass as shown in FIG. 7. Base body 13 also has a pair of holes 37, 37 each of which is located at the corners of base body 13 in a diagonal direction. The pair of holes 37, 37 is used to avoid free-rotation of base body 13 when mirror 11 is rotated by a motor (not shown).

Figure 8:
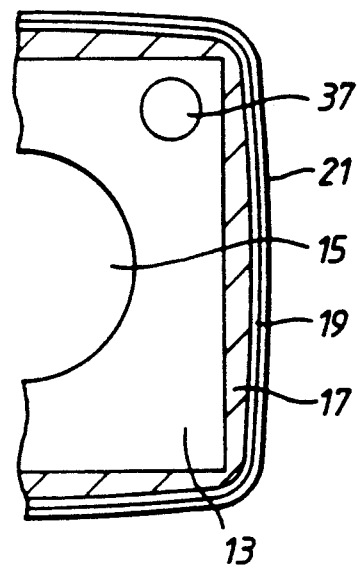
FIG. 8 is an enlarged partially cutaway view of the polygonal mirror shown in FIG. 7.

Base body 13 formed from glass is inserted into metal mold housing 31 to form non-spherical surface element 17 with an ultraviolet hardening resin by an injection molding. At this time, ultraviolet rays fed from lamp 33 are reflected by reflection mirror 35 toward the ultraviolet hardening resin formed on the surface of base body 13 and are radiated to the whole circumferential surface of the ultraviolet hardening resin. Thus, the ultraviolet hardening resin formed on the circumferential surface of base body 13 is cured and non-spherical surface element 17 is finally formed on base body 13. Base body 13 on which non-spherical surface element 17 is formed is taken out from metal mold housing 31 after the ultraviolet hardening resin is cured. Then, reflection film 19 and protection film 21 are respectively formed in order on the circumferential surface of non-spherical surface element 17 as shown in FIG. 8.

In the above-described embodiment, since the ultraviolet hardening resin is used to form non-spherical surface element 17 on base body 13, heating of metal mold housing 31 during the injection process is not required. Thus, the manufacturing process of non-spherical surface element 17 is simplified, as compared with the first manufacturing method.

Figure 9:
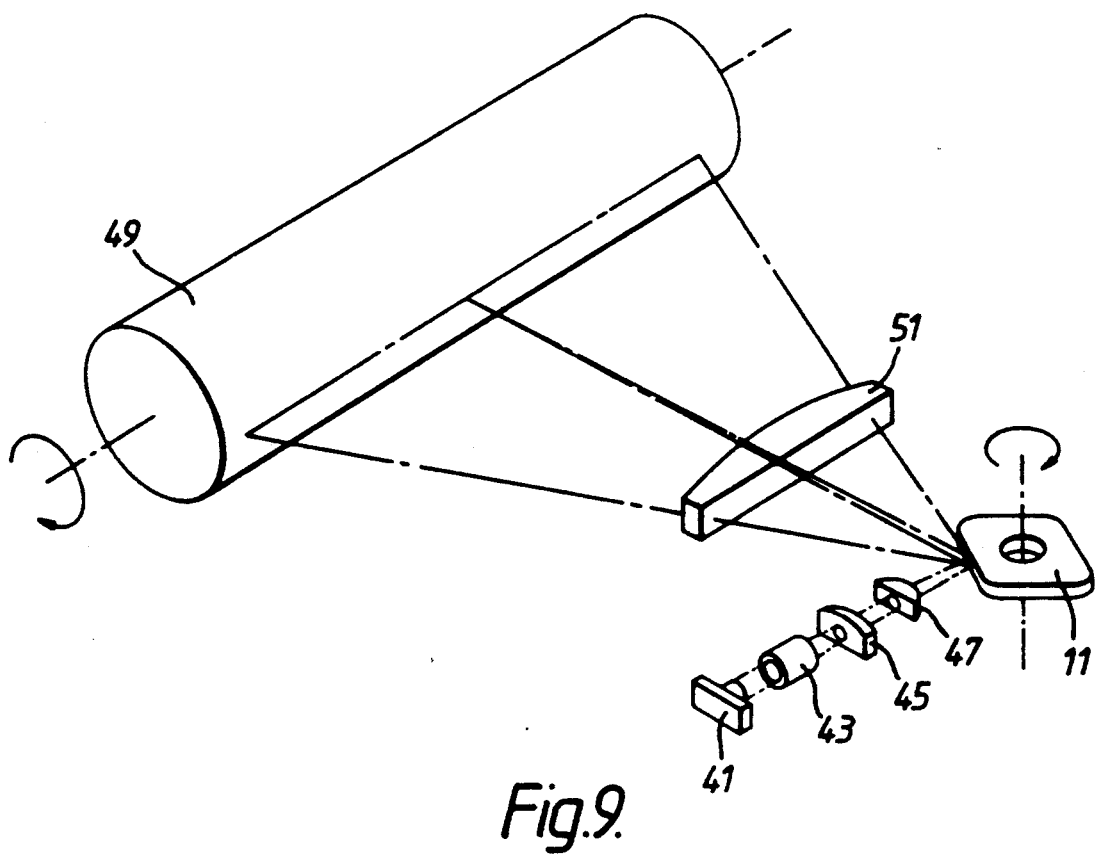
FIG. 9 is a schematic view illustrating one example of an optical system of a laser beam printer using the polygonal mirror.

As shown in FIG. 9, polygonal mirror 11 is used in the optical system of a laser beam printer. A laser beam produced by a laser diode 41 is fed to polygonal mirror 11 through a collimating lens 43, and first and second toric non-spherical lenses 45 and 47. The laser beam is reflected by polygonal mirror 11 and is focused on the surface of a photosensitive drum 49 (image carrier) through a non-spherical fθ lens 51 (a signal surface toric lens). The laser beam scans the surface of photosensitive drum 49 by the rotation of polygonal mirror 11. Thus, when laser diode 41 is turned on and off, based on the image signal, a latent image corresponding to the image signal is formed on the surface of photosensitive drum 49 by the rotation of polygonal mirror 11 and photosensitive drum 49.

According to the present invention, since a planomirror surface having a high accuracy is obtained by the formation of the reflection film on the non-spherical surface element fixed on the circumferential surface of the base body of the polygonal mirror, the material of the base body is not limited and the surface roughness of the base body and the non-spherical surface element may be at an average level.

According to the manufacturing method of the present invention, the non-spherical surface element is integrally formed on the circumferential surface of the base body of the polygonal mirror by an injection mold using synthetic resins. Thus, the material of the base body can be selected from steels, non-ferrous metals and non-metalic materials, e.g., a glass. Since only the non-spherical surface element is made of a synthetic resin by the injection mold, the ratio of synthetic resin contained in the entire construction of the polygonal mirror is significantly low and thus, dimensional changes in polygonal mirror caused by temperature changes or humidity changes can be maintained at an extremely low value. Furthermore, since the non-spherical surface element may be formed on the circumferential surface of the base body by the injection mold using an ultraviolet hardening resin, heating of the metal mold is not required during the injection process.

The present invention has been described with respect to specific embodiments. However, other embodiments based on the principles of the present invention should be obvious to those of ordinary skill in the art. Such embodiments are intended to be covered by the claims.

What is claimed is:

1. A polygonal mirror for reflecting an optical beam from a generator, comprising:
   a base body having a circumferential surface composed of a plurality of flat surfaces;
   a surface element attached to the circumferential surface of the base body to cover each of the flat surfaces, the surface element corresponding to each of the flat surfaces being formed an a non-spherical surface which has a continuously varied curvature; and
   reflection means, attached on the circumferential surface of the surface element to cover each of the non-spherical surfaces, for reflecting the optical beam.

2. A mirror according to claim 1 further including a protection means, attached on the reflection means for protecting the reflection means from scratching.

3. A mirror according to claim 1, wherein the reflection means includes a film on the circumferential surface of the surface element.

4. A mirror according to claim 1, wherein the surface element has a cylindroid shaped surface.

5. A mirror according to claim 1, wherein the surface element is made of a resin.

6. A mirror according to claim 1, wherein the base body is made of at least one of glass, steel and a non-ferrous metal.

7. A method for manufacturing a polygonal mirror having a non-spherical circumferential surface, comprising the steps of:
   preparing a base body having a circumferential surface composed of a plurality of flat surfaces;
   forming a non-spherical shaped surface element on the circumferential surface of the base body with a resin, to cover each of the flat surfaces, the surface element corresponding to each of the flat surfaces being formed as a non-spherical surface which has a continuously varied curvature; and
   forming a reflection film on the surface element to cover each of the non-spherical surfaces.

8. A method for manufacturing a polygonal mirror having a non-spherical surface, comprising the steps of:
   forming a base body having a circumferential surface composed of a plurality of flat surfaces and a central hole from a material which transmits ultraviolet rays;
   placing the base body in a mold housing which has a non-spherical shaped inner surface;
   filling an ultraviolet hardening resin between the circumferential surface of the base body and the mold housing to form a surface element on the base body, the surface element corresponding to each of the flat surfaces being formed as a non-spherical surface which has a continuously varied curvature;
   radiating ultraviolet rays toward the surface element through the central hole and the base body to cure the ultraviolet hardening resin; and
   forming a reflection film on the surface element to cover each of the non-spherical surfaces.

9. A system for reflecting a laser beam to an image carrier having an image forming surface, comprising:
   means for radiating a laser beam controlled by an image signal; and
   rotatable mirror means for reflecting the laser beam toward the image carrier to scan the image forming surface of the image carrier, the mirror means including,
   a base body having a circumferential surface composed of a plurality of flat surfaces;
   a surface element, formed on the circumferential surface of the base body to cover each of the flat surfaces, the surface element corresponding to each of the flat surfaces being formed as a non-spherical surface which has a continuously varied curvature; and
   reflection means, attached on the circumferential surface of the surface element to cover each of the non-spherical surfaces, for reflecting the laser beam.

10. A system according to claim 9, wherein the mirror means includes protection means on the reflection means for protecting the reflection means from scratching.

* * * * *